United States Patent [19]

Chen

[11] Patent Number: 5,730,300

[45] Date of Patent: Mar. 24, 1998

[54] COMPACT DISK SHELF ASSEMBLY

[75] Inventor: Shun-Teng Chen, Taoyuan, Taiwan

[73] Assignee: Shern Diau Enterprise Co., Ltd., Taoyuan, Taiwan

[21] Appl. No.: 654,281

[22] Filed: May 28, 1996

[51] Int. Cl.$^6$ .................................................. A47F 7/00
[52] U.S. Cl. .............................. 211/40; 211/194; D6/407; 206/387.15; 312/9.9
[58] Field of Search ........................... 211/40, 41, 194; D6/407; 206/387.15; 312/9.9

[56] References Cited

U.S. PATENT DOCUMENTS

| D. 346,510 | 5/1994 | Long et al. ........................ | D6/407 |
|---|---|---|---|
| D. 356,463 | 3/1995 | Davis ................................ | D6/407 X |
| D. 361,011 | 8/1995 | Weisburn et al. ................ | D6/407 X |
| D. 385,522 | 10/1997 | Weisburn et al. ................ | D6/407 X |
| 4,293,075 | 10/1981 | Veralrud .......................... | 211/40 |
| 5,191,983 | 3/1993 | Hardy .............................. | 211/40 |

*Primary Examiner*—Robert W. Gibson, Jr.
*Attorney, Agent, or Firm*—Alan Kamrath; Peterson, Wicks, Nemer & Kamrath, P.A.

[57] ABSTRACT

A compact disk shelf assembly comprises a first and second top plates, a first and second transverse middle plates, a first and second bottom plates, a first and second left lateral plates, a first and second right lateral plates, and a first and second longitudinal middle plates. The first transverse middle plate is disposed between the first and second left lateral plates and the first and second longitudinal middle plates. The second transverse middle plate is disposed between the first and second right lateral plates and the first and second longitudinal middle plates. The first top plate is disposed between the first longitudinal middle plate and the first left lateral plate. The second top plate is disposed between the first longitudinal middle plate and the first right lateral plate. The first bottom plate is disposed between the second longitudinal middle plate and the second left lateral plate. The second bottom plate is disposed between the second longitudinal middle plate and the second right lateral plate.

1 Claim, 4 Drawing Sheets

5,730,300

COMPACT DISK SHELF ASSEMBLY

BACKGROUND OF THE INVENTION

The present invention relates to a compact disk shelf assembly. More particularly, the present invention relates to a plurality of compact disk shelves which can be assembled together.

Most conventional compact disk shelves cannot be disassembled easily. Thus the volumes of the compact disk shelves cannot be reduced while transporting. The user cannot combine a plurality of compact disk shelves together. Some combinational type compact disk shelves can be assembled together. However, it is very difficult for the users to assemble the combinational type compact disk shelves.

SUMMARY OF THE INVENTION

An object of the present invention is to provide a compact disk shelf assembly which contains a plurality of compact disk shelves to be assembled easily.

Another object of the present invention is to provide a compact disk shelf assembly which contains a plurality of compact disk shelves to be disassembled easily.

The users can assemble the compact disk shelf assembly of the present invention by themselves easily. Thus the present invention eliminates the disadvantages of the conventional compact disk shelves. Further, each of the first and second left lateral plates, the first and second right lateral plates, and the first and second longitudinal middle plates has a slant edge to facilitate the fetch of the compact disks therein.

Accordingly, a compact disk shelf assembly comprises a first and second top plates, a first and second transverse middle plates, a first and second bottom plates, a first and second left lateral plates, a first and second right lateral plates, and a first and second longitudinal middle plates. Each of the first and second bottom plates has a lower plate. An upper left and right recesses are formed in two opposite sides of each of the first and second bottom plates. Each of the first and second top plates has an upper plate. A lower left and right recesses are formed in two opposite sides of each of the first and second top plates. Each of the first and second left lateral plates has a rectangular periphery rib and a middle rib on an outer face of each of the first and second left lateral plate, a plurality of transverse separators defining a plurality of corresponding spacings on an inner face of each of the first and second left lateral plates, and an upper and lower projecting rims on an upper and lower edges of each of the first and second left lateral plates, respectively. An inclined edge 36a or 36b is formed on a front edge of each of the first and second left lateral plates. Each of the first and second right lateral plates has a rectangular periphery strip and a middle strip on an outer face of each of the first and second right lateral plates, a plurality of transverse plates defining a plurality of corresponding intervals on an inner face of each of the first and second right lateral plates, and an upper and lower inserting flanges on an upper and lower edges of each of the first and second right lateral plates, respectively. A bevel edge is formed on a front edge of each of the first and second right lateral plates. The first transverse middle plate is disposed between the first and second left lateral plates and the first and second longitudinal middle plates. The second transverse middle plate is disposed between the first and second right lateral plates and the first and second longitudinal middle plates. The first top plate is disposed between the first longitudinal middle plate and the first left lateral plate. The second top plate is disposed between the first longitudinal middle plate and the first right lateral plate. The first bottom plate is disposed between the second longitudinal middle plate and the second left lateral plate. The second bottom plate is disposed between the second longitudinal middle plate and the second right lateral plate. An upper left, upper right, lower left and lower right channels are formed on an upper left side, upper right side, lower left side and lower right side of the first transverse middle plate, respectively. An upper left, upper right, lower left and lower right recess slots are formed on an upper left side, upper right side, lower left side and lower right side of the second transverse middle plate, respectively. Two pairs of upper and lower spaced protruding rims are disposed on a corresponding upper and lower edges of the first longitudinal middle plate, respectively. A plurality of transverse panels disposed on two opposite faces of the first longitudinal middle plate define a plurality of corresponding interspaces. A slant edge is formed on a front edge of the first longitudinal middle plate. Two pairs of upper and lower spaced extending rims are disposed on a corresponding upper and lower edges of the second longitudinal middle plate, respectively. A plurality of transverse strips disposed on two opposite faces of the second longitudinal middle plate define a plurality of corresponding clearances. A sloping edge is formed on a front edge of the second longitudinal middle plate. The upper spaced protruding rims are inserted in the corresponding lower right recess of the first top second top plate, rims are plate and lower left recess of the respectively. The lower spaced protruding rims are inserted in the corresponding upper right channel and upper left recess slot, respectively. The upper spaced extending rims are inserted in the corresponding lower right channel and lower left recess slot, respectively. The lower spaced extending rims are inserted in the corresponding upper right recess of the first bottom plate and upper left recess of the second bottom plate. The upper projecting rim of the first left lateral plate is inserted in the lower left recess of the first top plate. The lower projecting rim of the first left lateral plate is inserted in the upper left channel of the first transverse middle plate. The upper projecting rim of the second left lateral plate is inserted in the lower left channel of the first transverse middle plate. The lower projecting rim of the second left lateral plate is inserted in the upper left recess of inserting flange the first bottom plate. The upper of the first right lateral plate is inserted in the lower right recess of the second top plate. The lower inserting flange of the first right lateral plate is inserted in the upper right recess slot of the second transverse middle plate. The upper inserting flange of the second right lateral plate is inserted in the lower right recess slot of the second transverse middle plate. The lower inserting flange of the second right lateral plate is inserted in the upper right recess of the second bottom plate.

DETAILED DESCRIPTION OF THE INVENTION

Figure 1:
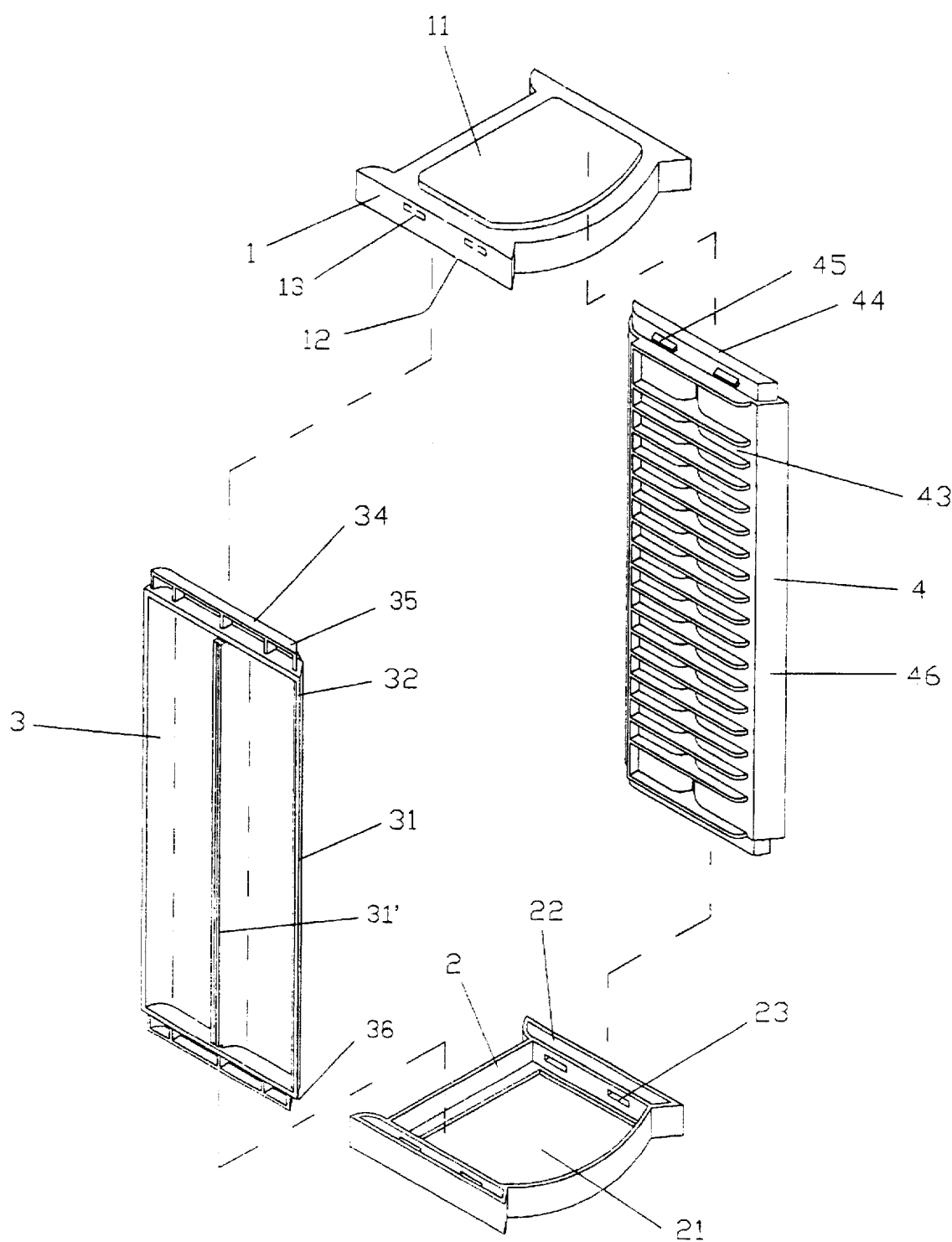
FIG. 1 is a perspective exploded view of a compact disk shelf of a preferred embodiment in accordance with the present invention.
Figure 2:
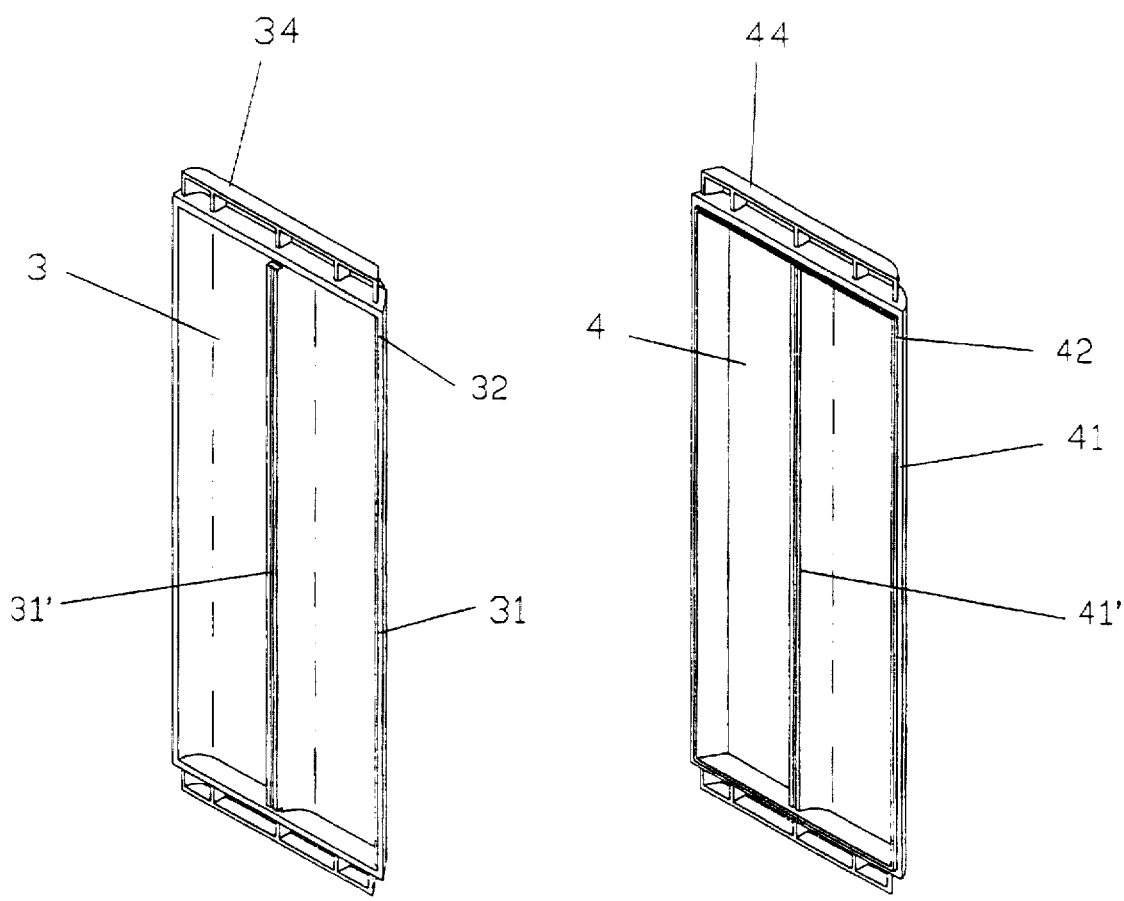
FIG. 2 is a perspective view of a left lateral plate and a right lateral plate.

Referring to FIGS. 1 and 2, a compact disk shelf comprises a pair of top plate 1 and bottom plate 2 and a pair of left lateral plate 3 and right lateral plate 4. All the corresponding plates 1, 2, 3 and 4 of the compact disk shelf are made of plastics. The structure of the top plate 1 is similar to the structure of the bottom plate 2. The bottom plate 2 has a lower plate 21. Two upper recesses 22 are two opposite sides of the bottom plate 2. Two pairs of inserted slots 23 are formed in two opposite sides of the bottom plate 2, respectively, to communicate with each corresponding upper recess 22. The top plate 1 has an upper plate 11. Two lower recesses 12 are formed in two opposite sides of the top plate 1o Two pairs of inserted holes 13 are formed in two opposite sides of the top plate 1, respectively, to communicate with the corresponding lower recesses 12. The structure of the left lateral plate 3 is similar to the structure of the right lateral plate 4. The left lateral plate 3 has a rectangular periphery rib 31 and a middle rib 31' on an outer face of the left lateral plate 3, a plurality of transverse separators defining a plurality of corresponding spacings 33 on an inner face of the left lateral plate 3, and an upper and lower projecting rims 34 on an upper and lower edges of the left lateral plate 3, respectively. Two pairs of snap blocks 35 are disposed on the upper and lower projecting rims 34, respectively. An inclined edge 36 is formed on a front edge of the left lateral plate 3. The right lateral plate 4 has a rectangular periphery strip 41 and a middle strip 41' on an outer face of the right lateral plate 4, a plurality of transverse plates defining a plurality of corresponding intervals 43 on an inner face of the right lateral plate 4, and an upper and lower inserting flanges 44 on an upper and lower edges of the right lateral plate 4, respectively. Two pairs of snap protrusions 45 are disposed on the upper and lower inserting flanges 44, respectively. A bevel edge 46 is formed on a front edge of the right lateral plate 4. The upper projecting rims 34 is inserted in the corresponding upper recess 12. The lower projecting rim 34 is inserted in the corresponding upper recess 22. The upper inserting flange 44 is inserted in the corresponding lower recess 12. The lower inserting flanges 44 is inserted in the corresponding upper recess 22. The upper snap blocks 35 are inserted in the corresponding inserted holes 13. The lower snap blocks 35 are inserted in the corresponding inserted slots 23. The upper snap protrusions 45 are inserted in the corresponding inserted holes 13. The lower snap protrusions 45 are inserted in the corresponding inserted slots 23.

Figure 3:
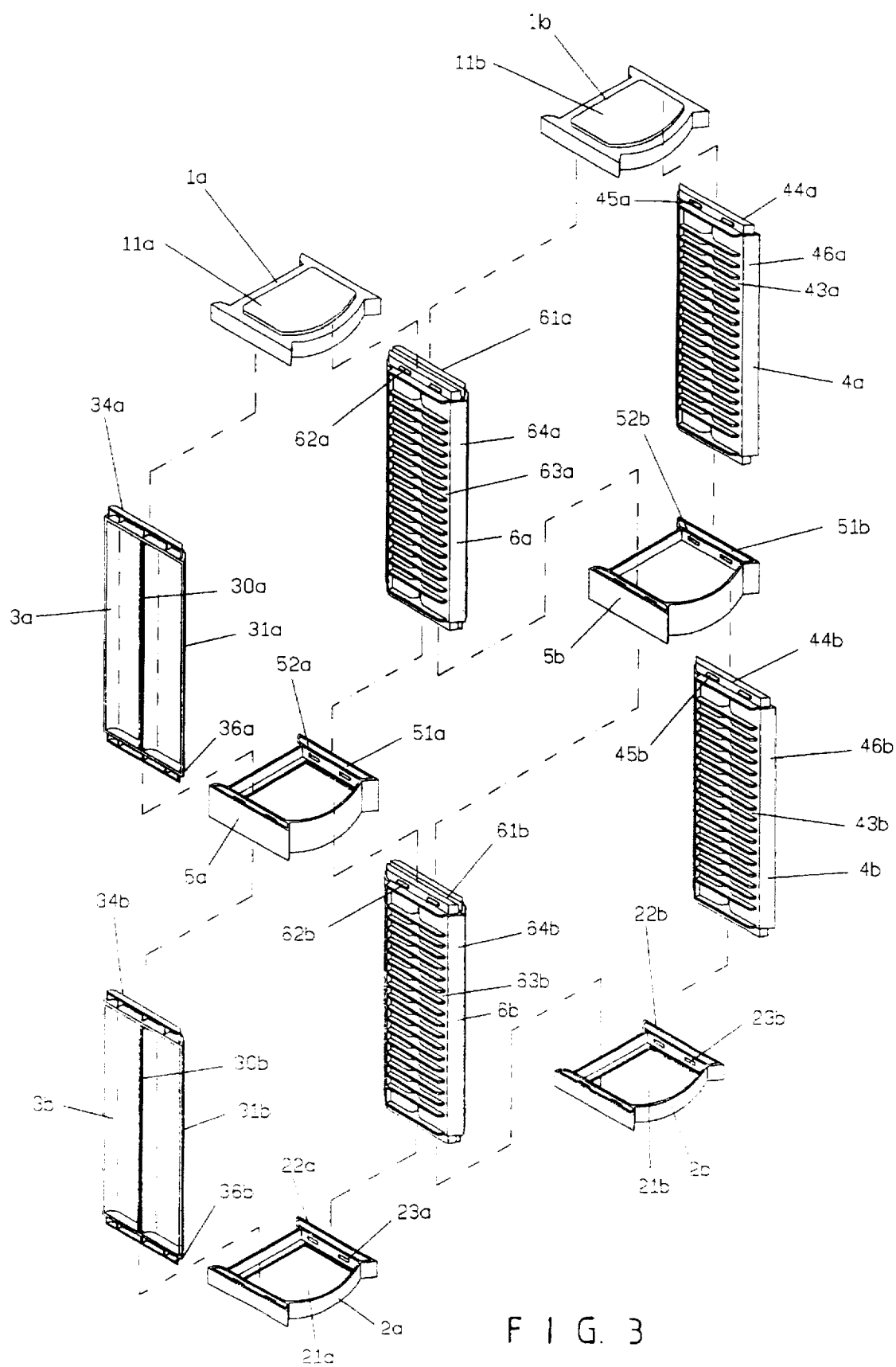
FIG. 3 is a perspective exploded view of a compact disk shelf assembly of a preferred embodiment in accordance with the present invention.
Figure 4:
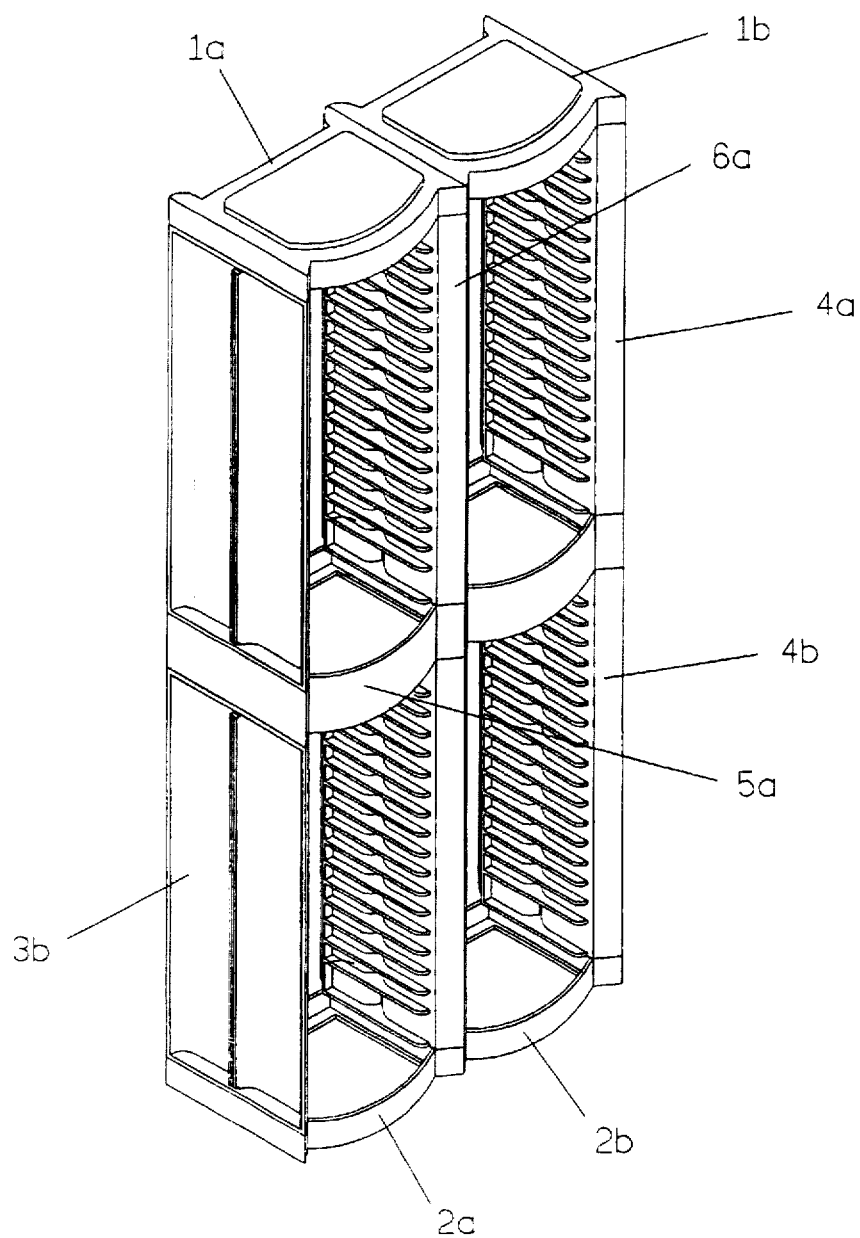
FIG. 4 is a perspective assembly view of a compact disk shelf assembly of FIG. 3.

Referring to FIGS. 3 and 4, a compact disk shelf assembly comprises a first and second top plates 1a and 1b, a first and second transverse middle plates 5a and 5b, a first and second bottom plates 2a and 2b, a first and second left lateral plates 3a and 3b, a first and second right lateral plates 4a and 4b, and a first and second longitudinal middle plates 6a and 6b. The structures of the first and second top plates 1a and 1b are the same as the structure of the top plate 1. The structures of the bottom plates 2a and 2b are the same as the structure of the bottom plate 2. The structures of the left lateral plates 3a and 3b are the same as the structure of the left lateral plate 3. The structures of the right lateral plates 4a and 4b are the same as the structure of the right lateral plate 4. Each bottom plate 2a or 2b has a lower plate 21a or 21b. An upper left and right recesses 22a or 22b are formed in two opposite sides of each bottom plate 2a or 2b. Two pairs of inserted slots 23a or 23b are formed in two opposite sides of each bottom plate 2a or 2b, respectively, to communicate with each corresponding upper recess 22a or 22b. Each top plate 1a or 1b has an upper plate 11a or 11b. A lower left and right recesses (not shown in the figures) are formed in two opposite sides of each top plate 1a or 1b. Two pairs of inserted holes (not shown in the figures) are formed in two opposite sides of each top plate 1a or 1b, respectively, to communicate with the corresponding lower recesses. Each left lateral plate 3a or 3b has a rectangular periphery rib 31a or 31b and a middle rib 30a or 30b on an outer face of each left lateral plate 3a or 3b, a plurality of transverse separators defining a plurality of corresponding spacings (not shown in the figures) on an inner face of the left lateral plate 3a or 3b, and an upper and lower projecting rims 34a or 34b on an upper and lower edges of each left lateral plate 3a or 3b, respectively. Two pairs of snap blocks (not shown in the figures) are disposed on the upper and lower projecting rims 34a or 34b, respectively. An inclined edge 36a or 36b is formed on a front edge of each left lateral plate 3a or 3b. Each right lateral plate 4a or 4b has a rectangular periphery strip (not shown in the figures) and a middle strip (not shown in the figures) on an outer face of each right lateral plate 4a or 4b, a plurality of transverse plates defining a plurality of corresponding intervals 43a or 43b on an inner face of each right lateral plate 4a or 4b, and an upper and lower inserting flanges 44a or 44b on an upper and lower edges of each right lateral plate 4, respectively. Two pairs of snap protrusions 45a or 45b are disposed on the corresponding upper and lower inserting flanges 44a or 44b, respectively. A bevel edge 46a or 46b is formed on a front edge of each right lateral plate 4a or 4b. A first transverse middle plate 5a is disposed between the first and second left lateral plates 3a and 3b and a first and second longitudinal middle plates 6a and 6b. The second transverse middle plate 5b is disposed between the first and second right lateral plates 4a and 4b and the first and second longitudinal middle plates 6a and 6b. An upper left, upper right, lower left and lower right channels 51a are formed on an upper left side, upper right side, lower left side and lower right side of the first transverse middle plate 5a, respectively. An upper left, upper right, lower left and lower right recess slots 51b are formed on an upper left side, upper right side, lower left side and lower right side of the second transverse middle plate 5b, respectively. Two pairs of upper and lower spaced protruding rims 61a are disposed on an upper and lower edges of the first longitudinal middle plate 6a. A plurality of transverse panels disposed on two opposite faces of the first longitudinal middle plate 6a define a plurality of corresponding interspaces 63a. Each protruding rim 61a has two protruding blocks 62a. A slant edge 64a is formed on a front edge of the first longitudinal middle plate 6a. Two pairs of upper and lower spaced extending rims 61b are disposed on an upper and lower edges of the second longitudinal middle plate 6b. A plurality of transverse strips disposed on two opposite faces of the second longitudinal middle plate 6b define a plurality of corresponding clearances 63b. Each extending rim 61b has two protruding stoppers 62b. A sloping edge 64b is formed on a front edge of the second longitudinal middle plate 6b. The upper spaced protruding rims 61a are inserted in the corresponding lower right recess of the first top plate 1a and lower left recess of the second top plate 1b, respectively. The lower spaced protruding rims 61a are inserted in the corresponding upper right channel 51a and upper left recess slot 51b, respectively. The upper spaced extending rims 61b are inserted in the corresponding lower right channel 51a and lower left recess slot 51b, respectively. The lower spaced extending rims 61b are inserted in the corresponding upper right recess 22a of the first bottom plate 2a and upper left recess 22b of the second bottom plate 2b. The upper projecting rim 34a of the first left lateral plate 3a is inserted in the lower left recess of the first top plate 1a. The lower projecting rim 34a of the first left lateral plate 3a is inserted in the upper left channel 51a of the first transverse middle plate 5a. The upper projecting rim 34b of the second left lateral plate 3b is inserted in the lower left channel 51a of the first transverse middle plate 5a. The lower projecting rim 34b of the second left lateral plate 3b is inserted in the upper left recess 22a of the first bottom plate 2a. The upper inserting flange 44a of the first right lateral plate 4a is inserted in the lower right recess of the second top plate 1b. The lower inserting flange 44a of the first right lateral plate 4a is inserted in the upper right recess slot 51b of the second transverse middle plate 5b. The upper inserting flange 44b of the second right lateral plate 4b is inserted in the lower right recess slot 51b of the second transverse middle plate 5b. The lower inserting flange 44b of the second right lateral plate 4b is inserted in the upper right recess 22b of the second bottom plate 2b.

The invention is not limited to the above embodiment but various modification thereof may be made. Further, various changes in form and detail may be made without departing from the scope of the invention.

I claim:

1. A compact disk shelf assembly comprising:

a first and second top plates, a first and second transverse middle plates, a first and second bottom plates, a first and second left lateral plates, a first and second right lateral plates, and a first and second longitudinal middle plates;

said first transverse middle plate disposed between said first and second left lateral plates and said first and second longitudinal middle plates, said second transverse middle plate disposed between said first and second right lateral plates and said first and second longitudinal middle plates, said first top plate disposed between said first longitudinal middle plate and said first left lateral plate, said second top plate disposed between said first longitudinal middle plate and said first right lateral plate, said first bottom plate disposed between said second longitudinal middle plate and said second left lateral plate, said second bottom plate disposed between said second longitudinal middle plate and said second right lateral plate;

each of said first and second bottom plates having a lower plate, an upper left and right recesses formed in two opposite sides of each of said first and second bottom plates;

each of said first and second top plates having an upper plate, a lower left and right recesses formed in two opposite sides of each of said first and second top plates;

each of said first and second left lateral plates having a rectangular periphery rib and a middle rib on an outer face of each of said first and second left lateral plate, a plurality of transverse separators defining a plurality of corresponding spacings on an inner face of each of said first and second left lateral plates, and an upper and lower projecting rims on an upper and lower edges of each of said first and second left lateral plates, respectively;

an inclined edge formed on a front edge of each of said first and second left lateral plates;

each of said first and second right lateral plates having a rectangular periphery strip and a middle strip on an outer face of each of said first and second right lateral plates, a plurality of transverse plates defining a plurality of corresponding intervals on an inner face of each of said first and second right lateral plates, and an upper and lower inserting flanges on an upper and lower edges of each of said first and second right lateral plates, respectively;

a bevel edge formed on a front edge of each of said first and second right lateral plates;

an upper left, upper right, lower left and lower right channels formed on an upper left side, upper right side, lower left side and lower right side of said first transverse middle plate, respectively;

an upper left, upper right, lower left and lower right recess slots formed on an upper left side, upper right side, lower left side and lower right side of said second transverse middle plate, respectively;

two pairs of upper and lower spaced protruding rims disposed on a corresponding upper and lower edges of said first longitudinal middle plate, respectively;

a plurality of transverse panels disposed on two opposite faces of said first longitudinal middle plate defining a plurality of corresponding interspaces;

a slant edge formed on a front edge of said first longitudinal middle plate;

two pairs of upper and lower spaced extending rims disposed on a corresponding upper and lower edges of said second longitudinal middle plate, respectively;

a plurality of transverse strips disposed on two opposite faces of said second longitudinal middle plate defining a plurality of corresponding clearances;

a sloping edge formed on a front edge of said second longitudinal middle plate;

said upper spaced protruding rims inserted in said corresponding lower right recess of said first top plate and said corresponding lower left recess of said second top plate, respectively;

said lower spaced protruding rims inserted in said corresponding upper right channel and said corresponding upper left recess slot, respectively;

said upper spaced extending rims inserted in said corresponding lower right channel and said corresponding lower left recess slot, respectively;

said lower spaced extending rims inserted in said corresponding upper right recess of said first bottom plate and said corresponding upper left recess of said second bottom plate, respectively;

said upper projecting rim of said first left lateral plate inserted in said lower left recess of said first top plate;

said lower projecting rim of said first left lateral plate inserted in said upper left channel of said first transverse middle plate;

said upper projecting rim of said second left lateral plate inserted in said lower left channel of said first transverse middle plate;

said lower projecting rim of said second left lateral plate inserted in said upper left recess of said first bottom plate;

said upper inserting flange of said first right lateral plate inserted in said lower right recess of said second top plate;

said lower inserting flange of said first right lateral plate inserted in said upper right recess slot of said second transverse middle plate;

said upper inserting flange of said second right lateral plate inserted in said lower right recess slot of said second transverse middle plate;

said lower inserting flange of said second right lateral plate inserted in said upper right recess of said second bottom plate.

* * * * *